US012582137B2

(12) United States Patent
Kato et al.

(10) Patent No.: US 12,582,137 B2
(45) Date of Patent: Mar. 24, 2026

(54) APPARATUS FOR PRODUCING NON-SPLATTER COOKING OIL

(71) Applicants: AQUA DESIGN INC., Saitama (JP); Yoko Mori, Tokyo (JP); SUCCESS PROJECT CO., LTD., Yokohama (JP); Akihiro Kato, Yokohama (JP); Teruhito Irifune, Yokohama (JP)

(72) Inventors: Akihiro Kato, Yokohama (JP); Teruhito Irifune, Yokohama (JP)

(73) Assignees: AQUA DESIGN INC., Saitama (JP); Yoko Mori, Tokyo (JP); SUCCESS PROJECT CO., LTD., Yokohama (JP); Akihiro Kato, Yokohama (JP); Teruhito Irifune, Yokohama (JP)

( * ) Notice: Subject to any disclaimer, the term of this patent is extended or adjusted under 35 U.S.C. 154(b) by 796 days.

(21) Appl. No.: 17/912,700

(22) PCT Filed: Mar. 23, 2020

(86) PCT No.: PCT/JP2020/012808
§ 371 (c)(1),
(2) Date: Sep. 19, 2022

(87) PCT Pub. No.: WO2021/191990
PCT Pub. Date: Sep. 30, 2021

(65) Prior Publication Data
US 2023/0172225 A1    Jun. 8, 2023

(51) Int. Cl.
*A23D 9/04* (2006.01)

(52) U.S. Cl.
CPC ..................................... *A23D 9/04* (2013.01)

(58) Field of Classification Search
CPC ..... A47J 37/1266–1271; A47J 37/1257; A23L 5/15; A23L 5/30; A23L 5/11; H05B 6/00–40; H05B 6/80–804
USPC ........................................................ 210/695
See application file for complete search history.

(56) References Cited

U.S. PATENT DOCUMENTS

| | | | |
|---|---|---|---|
| 5,348,050 A * | 9/1994 | Ashton | F02M 27/045 210/222 |
| 7,740,764 B1 * | 6/2010 | Manning | C02F 1/481 210/695 |
| 2012/0022694 A1 | 1/2012 | Mohanty et al. | |
| 2014/0263077 A1 * | 9/2014 | Lombardi | B03C 1/286 210/695 |
| 2019/0038077 A1 * | 2/2019 | Tanaka | A23L 5/15 |

FOREIGN PATENT DOCUMENTS

| | | |
|---|---|---|
| JP | 2001-089789 A | 4/2001 |
| JP | 2002-188094 A | 7/2002 |
| JP | 2004-144012 A | 5/2004 |

(Continued)

OTHER PUBLICATIONS

English translation to JP 2004144012 (Year: 2004).*

(Continued)

*Primary Examiner* — Sang Y Paik
*Assistant Examiner* — Bonita Khlok
(74) *Attorney, Agent, or Firm* — HAUPTMAN HAM, LLP

(57) ABSTRACT

Provided is a non-splatter cooking oil even when water is mixed during heating. A magnetic field having a frequency higher than 200 kHz is applied to an edible oil.

8 Claims, 5 Drawing Sheets

(56)     References Cited

FOREIGN PATENT DOCUMENTS

| JP | 2004144012 | * | 5/2004 |
| JP | 2008-154922 | A | 7/2008 |
| JP | 2009-183267 | A | 8/2009 |
| JP | 2019-24487 | A | 2/2019 |
| WO | 2010/073435 | A1 | 7/2010 |
| WO | 2015/121897 | A1 | 8/2015 |

OTHER PUBLICATIONS

PCT/ISA/210, "International Search Report for PCT International Application No. PCT/JP2020/012808," May 26, 2020.
Japan Patent Office, "Office Action for Japanese Patent Application 2021-529757," May 17, 2022.

* cited by examiner

Fig. 1

APPARATUS FOR PRODUCING NON-SPLATTER COOKING OIL

RELATED APPLICATIONS

The present application is National Phase of International Application No. PCT/JP2020/012808 filed Mar. 23, 2020, the disclosure of which is hereby incorporated by reference herein in its entirety.

TECHNICAL FIELD

The present invention relates to a method for producing a non-splatter cooking oil, a producing apparatus for the same, and a magnetic field generation device for production thereof.

BACKGROUND ART

For example, Patent Literature 1 discloses a method for preventing oxidative deterioration of edible oil. In this method, an electromagnetic wave generator including a coil unit is installed in a tank that stores edible oil, and an alternating current having a frequency band of 4 kHz to 10 kHz is supplied to the coil unit. The electromagnetic wave generated by the coil unit is applied to the edible oil in the tank.

Furthermore, although not related to the edible oil, Patent Literature 2 discloses a fuel processing apparatus that contributes to improvement of fuel consumption efficiency of an internal combustion engine by effectively subdividing clusters of fuel molecules and preventing recombination. The fuel processing apparatus includes a plurality of electromagnets disposed on way of a fuel supply pipe. These electromagnets are disposed so as to face the center of the supply pipe, and are disposed at a constant rotation angle, for example, four electromagnets at intervals of 90 degrees. The electromagnets are controlled with a pulse voltage such that a state of generating a magnetic field and a state of not generating a magnetic field are repeated, thereby applying a dynamic magnetic field to the fuel flowing through the supply pipe. It is described that a good improving effect on fuel consumption can be obtained by setting the frequency of the pulse voltage to a range of 10 to 200 KHz, particularly 60 to 80 KHz.

CITATION LIST

Patent Literature

Patent Literature 1: WO 2010/073435 A
Patent Literature 2: JP 2004-144012 A

SUMMARY OF INVENTION

Technical Problem

Meanwhile, in a case where an ingredient is put in a fryer, a pot, or the like while heating the edible oil stored therein, the edible oil splashes due to water in the ingredient, and there is a risk of causing a fire or a burn. As a result of intensive studies by the present inventors, it has been found that a non-splatter cooking oil even in such a state can be obtained by subjecting the edible oil to a special processing.

The present invention has been made in view of such circumstances, and an object thereof is to provide a non-splatter cooking oil even when water is mixed during heating.

Solution to Problem

In order to solve such a problem, a first invention provides a method for producing a non-splatter cooking oil by applying a magnetic field having a frequency higher than 200 kHz to the edible oil.

Here, in the first invention, the frequency of the magnetic field is preferably lower than 350 kHz. Furthermore, the edible oil in a circulation flow path may be circulated, and application of the magnetic field to the edible oil may be repeated by a magnetic field generation device disposed in a vicinity of the circulation flow path.

A second invention provides a producing apparatus for a non-splatter cooking oil, including a storage unit, a circulation flow path, a pump, and a magnetic field generation device. The storage unit stores the edible oil. An upstream end and a downstream end of the circulation flow path are connected to different positions of the storage unit. The pump causes the edible oil in the circulation flow path to flow in one direction. The magnetic field generation device is disposed in the vicinity of the circulation flow path and applies a magnetic field having a frequency higher than 200 kHz to the edible oil flowing through the circulation flow path.

A third invention provides a magnetic field generation device for producing a non-splatter cooking oil that applies a magnetic field having a frequency higher than 200 kHz to the edible oil.

Here, in the second invention and the third invention, the frequency of the magnetic field is preferably lower than 350 kHz.

Advantageous Effects of Invention

According to the present invention, by applying a magnetic field having a frequency higher than 200 kHz to an edible oil, it is possible to obtain a non-splatter cooking oil even when water is mixed due to putting in an ingredient or the like during heating.

BRIEF DESCRIPTION OF DRAWINGS

FIG. 1 is a configuration diagram of a producing apparatus for a non-splatter cooking oil.

DESCRIPTION OF EMBODIMENTS

Figure 1:
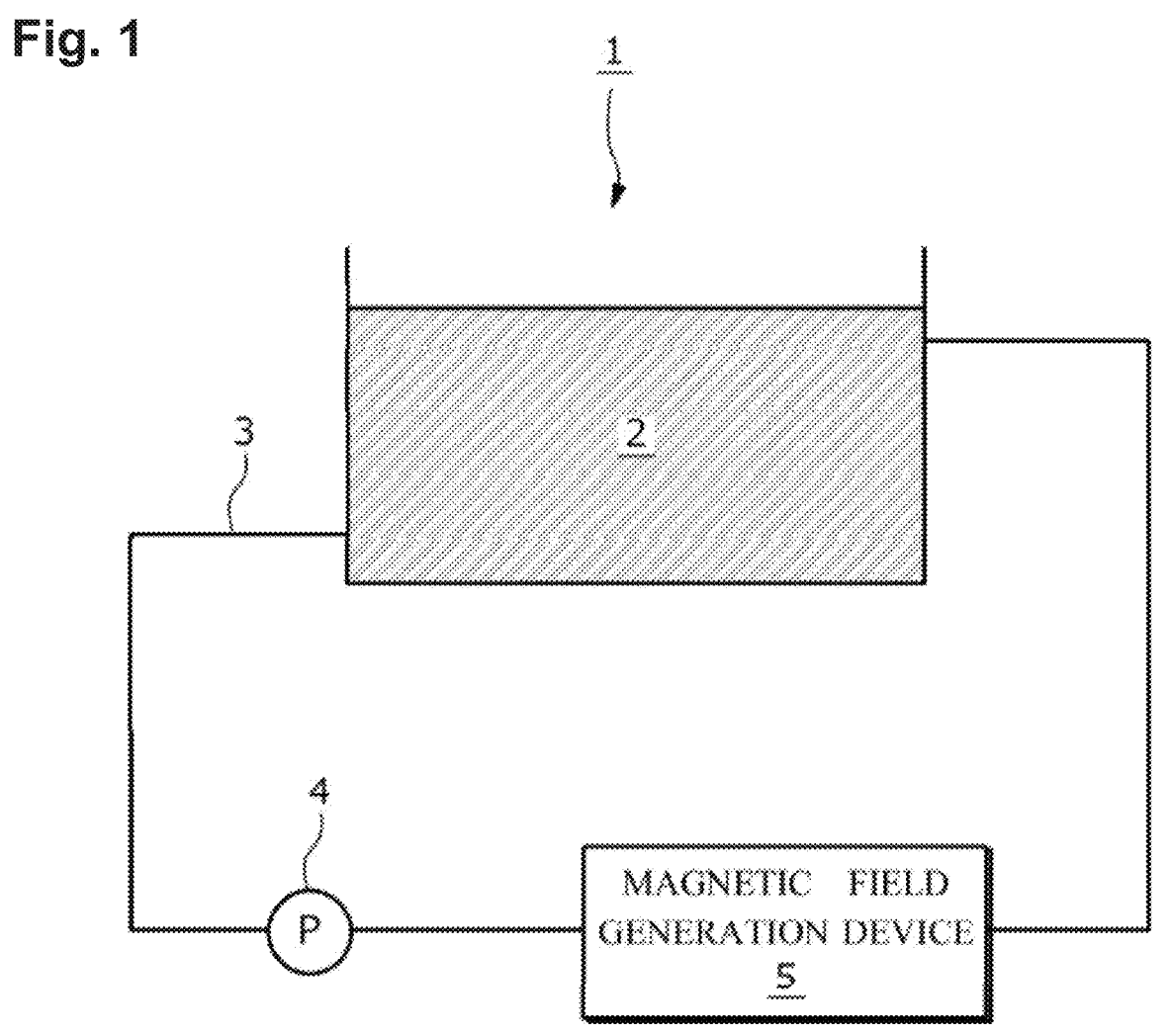
Figure 2:
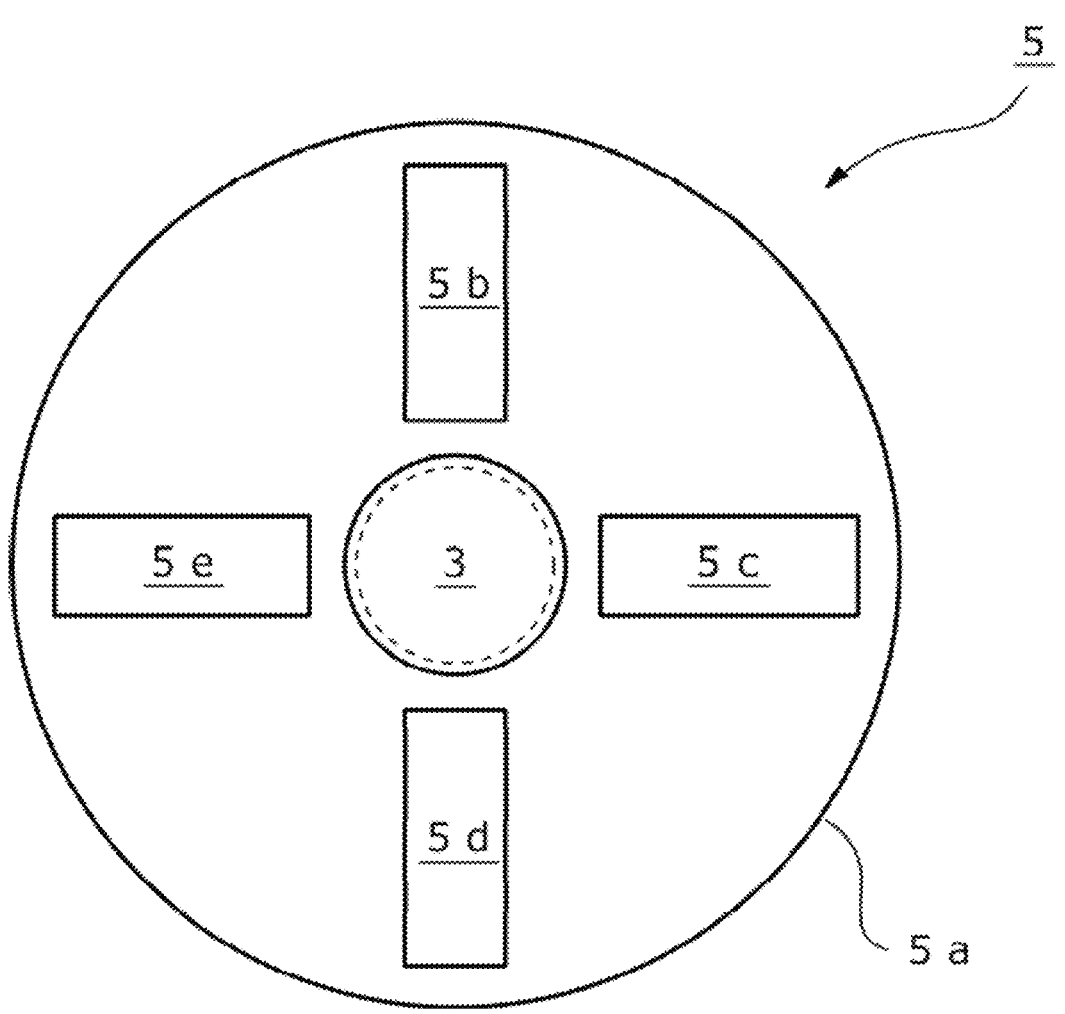
FIG. 2 is a configuration diagram of a magnetic field generation device.

FIG. 1 is a configuration diagram of a producing apparatus for a non-splatter cooking oil according to the present embodiment. A producing apparatus 1 for an edible oil includes a storage unit 2, a circulation flow path 3, a pump 4, and a magnetic field generation device 5. The storage unit 2 stores the edible oil to be treated. The producing apparatus 1 widely treats edible oils in general, such as salad oil, olive oil, sesame oil, *camellia* oil, rice oil, soybean oil, *perilla* oil, sesame oil, canola oil, linseed oil, grape seed oil, sunflower oil, coconut oil, MCT oil, green nut oil, safflower oil, avocado oil, peanut oil, cottonseed oil, corn oil, tea seed oil, and almond oil. Moreover, the edible oil is supplied and recovered via the storage unit 2. An upstream end and a downstream end of the circulation flow path 3 are connected to different positions of the storage unit 2, whereby a circulation path for circulating the edible oil in the storage unit 2 is formed. The pump 4 causes the edible oil in the circulation flow path 3 to flow in one direction. The magnetic field generation device 5 is disposed in the vicinity of the circulation flow path 3, and applies a magnetic field in which the magnetic field periodically changes to the edible oil flowing through the circulation flow path 3.

A lower limit of frequency of the magnetic field applied to the edible oil, in other words, of the magnetic field generated by the magnetic field generation device 5 needs to be higher than 200 kHz. At a frequency equal to or lower than that, the effect of preventing a phenomenon that the heated edible oil splashes cannot be sufficiently obtained, or the obtained effect is not good enough. Furthermore, an upper limit of the frequency does not particularly exist, but is desirably lower than 350 kHz. This is because, at higher frequencies, there is no noticeable difference in the effect of preventing the splashing of the edible oil, and it rather causes a waste of power for driving the magnetic field generation device 5.

Furthermore, the magnetic field applied to the edible oil may be an alternating magnetic field in which magnitude of the magnetic field continuously changes, or may be a pulsatile magnetic field in which the magnitude of the magnetic field changes stepwise.

As a procedure for producing the non-splatter cooking oil, the edible oil is supplied to the storage unit 2 first. Next, the pump 4 is driven to circulate the edible oil in the circulation flow path 3, and the application of the magnetic field to the edible oil is repeated by the magnetic field generation device 5. Then, after a predetermined time has elapsed, the edible oil is recovered from the storage unit 2, and the non-splatter cooking oil is obtained.

FIG. 2 is the configuration diagram of the magnetic field generation device 5. The magnetic field generation device 5 includes a main body 5a and a plurality of electromagnets 5b to 5d. The main body 5a has a disk-like shape and is made of a synthetic resin, a glass, a metal, and the like. A through hole having an inner diameter corresponding to the outer diameter of the pipe of the circulation flow path 3 is formed at the center of the main body 5a, and the pipe of the circulation flow path 3 is inserted into the through hole. Furthermore, the plurality of electromagnets 5b to 5e in which a coil is wound around an iron core are attached to one surface of the main body 5a. These electromagnets 5b to 5e extend in a radial direction with respect to a central axis of the circulation flow path 3 such that end portions thereof face the circulation flow path 3 side, and are disposed point-symmetrically at constant rotation intervals (for example, at equal intervals of 90 degrees). In addition, although at least one electromagnet is sufficient, a plurality of electromagnets are more advantageous from viewpoint of applying the magnetic field to the edible oil in the circulation flow path 3 more strongly (however, the number thereof is arbitrary).

Advantages of using electromagnets instead of permanent magnets as a generation source of the magnetic field applied to the edible oil are as follows. When the circulation flow path 3 is made of a material such as copper, aluminum, or stainless steel other than a steel pipe (iron), both the permanent magnets and the present apparatus can subdivide the edible oil in the circulation flow path 3 through a magnetic force. However, in the case of permanent magnets, since there is no temporal change (in the frequency), the edible oil tends to immediately return to its original state with time. On the other hand, in the case of electromagnets, an alternating magnetic field is generated inside the circulation flow path 3 to subdivide the edible oil, such that the subdivided state is maintained for a long time.

The plurality of electromagnets 5b to 5e are controlled such that the end portions facing the circulation flow path 3 always have the same polarity. In other words, when the opposite end of a certain electromagnet 5b is an N pole, the opposite ends of the other electromagnets 5c to 5d are also the N pole, and when the opposite end of the electromagnet 5b is an S pole, the opposite end portions of the other electromagnets 5c to 5d are also the S pole. The direction of the magnetic field generated by the electromagnets 5b to 5e is an important factor in obtaining the effect of preventing the splashing of the edible oil, and the best effect can be obtained when the electromagnets 5b to 5e are disposed such that the end portions (poles) of the electromagnets 5b to 5e face the circulation flow path 3, that is, the electromagnets 5b to 5d extend in the radial direction with respect to the circulation flow path 3, as in the present embodiment.

Figure 3:
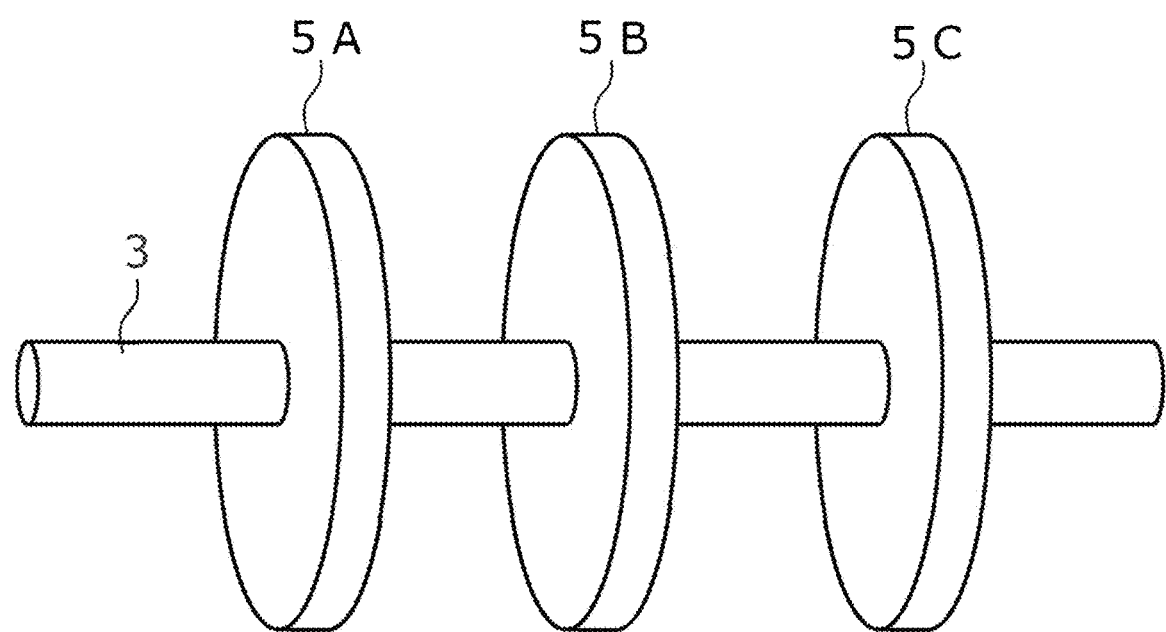
FIG. 3 is a diagram illustrating a state in which a plurality of magnetic field generation devices are installed.
Figure 4:
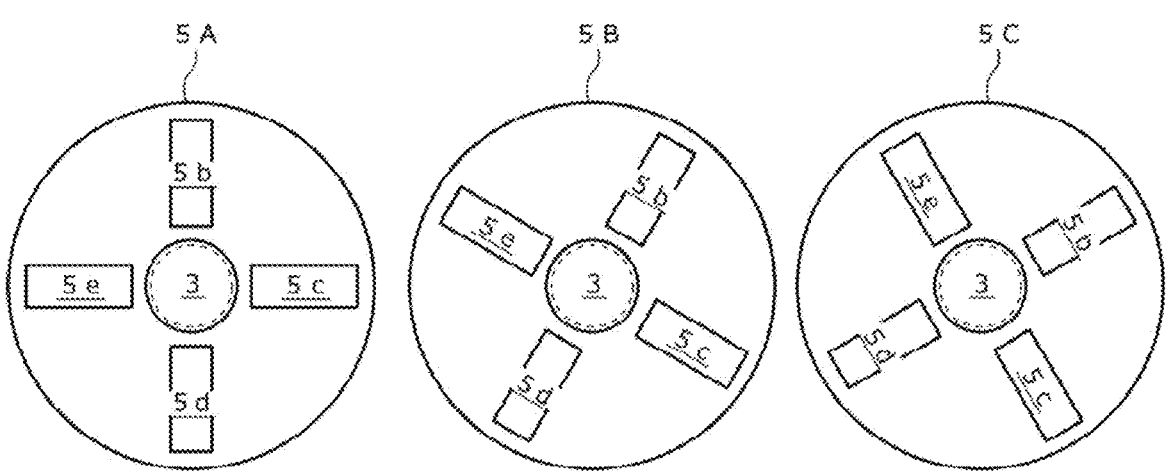
FIG. 4 is a diagram illustrating a state in which a plurality of magnetic field generation devices are rotated.

The magnetic field generation device 5 may be provided only at one position in the circulation flow path 3, but as shown in FIG. 3, a plurality of magnetic field generation devices 5A to 5C may be provided at a plurality of different positions in the circulation flow path 3. In this case, as shown in FIG. 4, it is preferable to arrange the respective magnetic field generation devices 5A to 5C to be shifted in a rotation direction. In the example of FIG. 4, the three magnetic field generation devices 5A to 5C are offset by 30 degrees. Accordingly, the magnetic field can be more uniformly applied to the edible oil in the circulation flow path 3.

Figure 5:
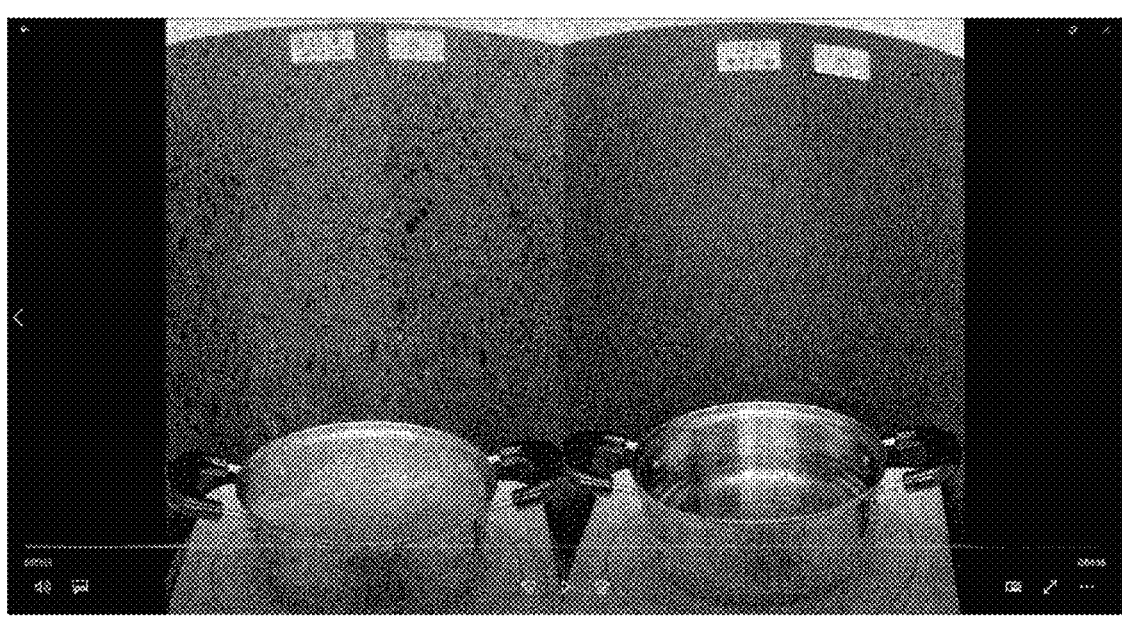
FIG. 5 is a comparative image showing a state in which water is added dropwise to salad oil (an edible oil) heated to 180° C.

As described above, according to the present embodiment, by applying a magnetic field having a frequency higher than 200 kHz to the edible oil, it is possible to obtain the non-splatter cooking oil even when water is mixed due to putting in an ingredient or the like during heating. FIG. 5 is a comparative image showing a state in which a predetermined amount of water is dropped with a dropper into 1 to 1.5 liters of salad oil (edible oil) heated to 180° C. On right part of FIG. 5, a state of an example in which a magnetic field having a frequency of 216 kHz is applied to salad oil is shown, while on left part of FIG. 5, a state of the same amount of salad oil (comparative example) without such processing is shown. The processing conditions of the example are as follows: application time of the magnetic field is about 40 minutes, 12 magnetic field generation devices each having an inductance of about 220 μH are used, a negative high-voltage circuit (input: 12 V, 0.3 A, output: −12,000 V) is used as a voltage supply source to the coil, and an AC adapter consumes a total of DC 12 V and 1.3 A. In the comparative example, it can be seen that the salad oil is splashing vigorously, whereas in the example, such splash does not occur at all. Furthermore, as a general indication of the processing time for the edible oil when the amount of the edible oil is between 10 and 50 liters, the edible oil may be circulated at normal temperature for about 30 to 60 minutes.

Moreover, according to the present embodiment, by repeating the application of the magnetic field to the edible oil circulating in the circulation flow path 3, it is possible to efficiently apply the magnetic field without causing an increase in size of the producing apparatus 1.

In addition, in the present description, the "non-splashing" edible oil is used in the sense that splash does not occur at all or the splash is greatly reduced as compared with the edible oil before the processing.

REFERENCE SIGNS LIST

1 Producing apparatus for an edible oil
2 Storage unit
3 Circulation flow path
4 Pump
5, 5A to 5C Magnetic field generation device

The invention claimed is:

1. A producing apparatus for a non-splatter cooking oil comprising:

a circulation flow path configured to have an upstream end and a downstream end connected to a storage tank that stores an edible oil;

a pump configured to cause the edible oil in the circulation flow path to flow in one direction;

a magnetic field generation device including at least one electromagnet having a first end and a second end portions, each of the first and second end portions forming a magnetic pole of opposite polarity, disposed outside a pipe of the circulation flow path, in which the at least one electromagnet extends in a radial direction with respect to a central axis of the circulation flow path such that the first end portion of the at least one electromagnet faces toward the circulation flow path and the second end portion of the at least one electromagnet faces away from the circulation flow path, and an alternating magnetic field having a frequency higher than 200 kHz is applied to the edible oil flowing through the circulation flow path using the at least one electromagnet as a generation source of the alternating magnetic field, while the edible oil remains confined within the pipe, wherein the application of the alternating magnetic field subdivides the edible oil so as to suppress spattering caused by water droplets or water contained in a food ingredient added in the edible oil when the edible oil is heated.

2. The producing apparatus for the non-splatter cooking oil according to claim 1, wherein the frequency of the magnetic field is lower than 350 kHz.

3. The producing apparatus for the non-splatter cooking oil according to claim 1, wherein the plurality of the electromagnets is disposed at predetermined rotation intervals with respect to the central axis of the circulation flow path, and each of the first end portion of the plurality of the electromagnets facing the circulation flow path are controlled to have the same polarity.

4. The producing apparatus for the non-splatter cooking oil according to claim 3, wherein the plurality of the electromagnets are housed in at least one disk-like shaped main body having a through hole in a center, in which the pipe of the circulation flow path is inserted into the through hole.

5. The producing apparatus for the non-splatter cooking oil according to claim 4, wherein the plurality of the electromagnets in each of the disk-like main body are arranged at different angular orientations with respect to a central axis of the circulation flow path.

6. The producing apparatus for the non-splatter cooking oil according to claim 4, wherein four electromagnets in each of the disk-like main body are arranged at 90-degree angular intervals with respect to a central axis of the circulation flow path.

7. The producing apparatus for the non-splatter cooking oil according to claim 1, wherein the magnetic field is repeatedly applied circulating edible oil.

8. A producing apparatus for a non-splatter cooking oil comprising:

a circulation flow path comprising a pipe configured to have an upstream end and a downstream end connected to a storage tank that stores an edible oil;

a pump configured to cause the edible oil in the circulation flow path to flow in one direction;

a magnetic field generation device including at least one electromagnet having a first end and a second end portions, each of the first and second end portions forming a magnetic pole of opposite polarity, arranged outside the pipe of the circulation flow path, in which the at least one electromagnet extends in a radial direction with respect to a central axis of the pipe of the circulation flow path such that the first end portion of the at least one electromagnet faces toward pipe, and the second end portion of the at least one electromagnet faces away from the pipe, and an alternating magnetic field having a frequency higher than 200 kHz is applied to the edible oil flowing through the circulation flow path using the at least one electromagnet as a generation source of the alternating magnetic field, wherein the alternating magnetic field causes changes in physical properties of the edible oil so as to suppress spattering caused by water droplets or water contained in a food ingredient added in the edible oil when the edible oil is heated.

\* \* \* \* \*